March 25, 1930.                H. BRUCKER                1,751,974
                            COOKING APPARATUS
                         Filed Oct. 19, 1928            2 Sheets-Sheet 1
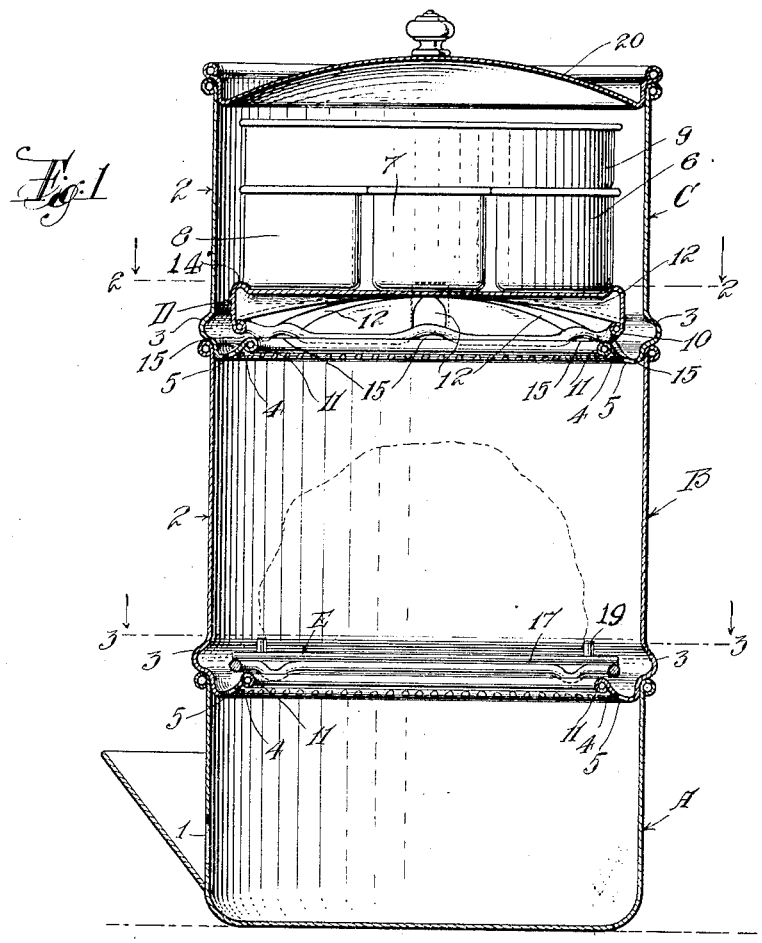
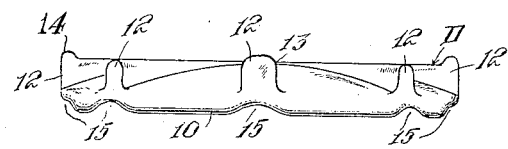
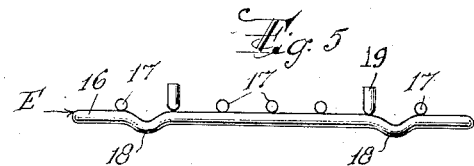

March 25, 1930.  H. BRUCKER  1,751,974
COOKING APPARATUS
Filed Oct. 19, 1928  2 Sheets-Sheet 2
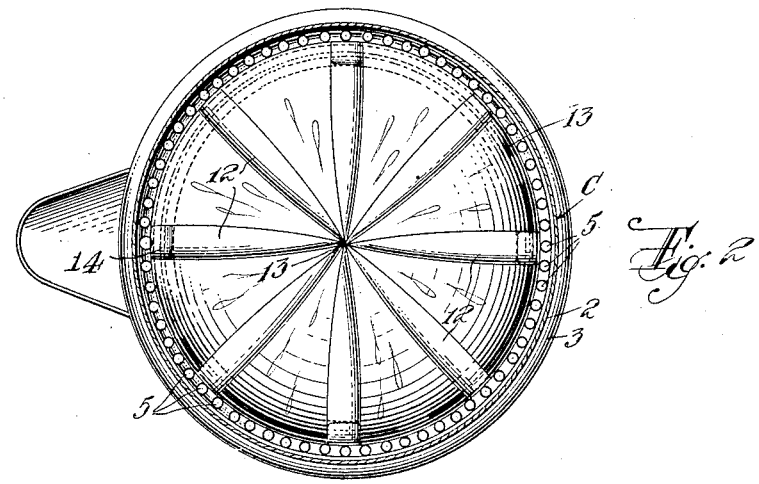
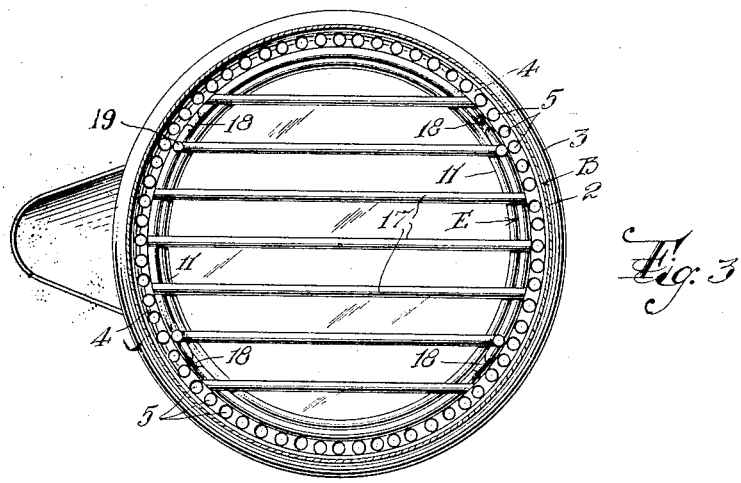
INVENTOR
Henry Brucker,
BY
ATTORNEYS Patented Mar. 25, 1930

1,751,974

UNITED STATES PATENT OFFICE

HENRY BRUCKER, OF MAPLEWOOD, NEW JERSEY

COOKING APPARATUS

Application filed October 19, 1928. Serial No. 313,429.

This invention relates to cooking vessels especially designed for preparing or cooking foods or other materials by a steaming process which includes a plurality of superposed compartments or containers in the bottom one of which is generated steam which is conducted upwardly into all the other compartments.

One object of the invention is to provide a cooking apparatus of this character in which the upper steaming containers or compartments embody novel and improved features of construction whereby contact of the condensed steam with the foods or material in the various steaming compartments is minimized and the water of condensation on the inner walls of the cooker and outer walls of the cooking vessels is conducted directly to the bottom container or boiler.

Another object is to provide such a cooking apparatus wherein each steaming compartment comprises a novel and improved construction and combination of a tubular casing and a rack removably set within it to support the food or material directly or cooking pans in which the food or material may be placed, said casing being so constructed as to rest upon the boiler or bottom compartment whereby steam can rise upwardly into said steaming compartment and the water of condensation flow back to the boiler with minimum contact with the food or material in the steaming compartment.

Other objects are to provide a cooking apparatus of this character wherein said casings of the steaming compartments have inturned perforated flanges adjacent their bottoms to support said racks so that the steam and water of condensation may flow to and from the steaming compartments respectively through the perforations in said flanges; to provide a novel and improved rack for such a steaming compartment which is constructed to conduct the water of condensation formed thereon and the pans supported thereby to said flanges, and to obtain other advantages and results as will be brought out by the following description.

Referring to the accompanying drawings, in which like numerals of reference designate the same parts throughout the several views, Figure 1 is a vertical longitudinal sectional view through a cooking apparatus embodying my invention.

Figure 2 is a horizontal sectional view taken on the line 2—2 of Figure 1.

Figure 3 is a similar view taken on the line 3—3 of Figure 1.

Figure 4 is a side elevation of the pan supporting rack shown in Figure 2, and

Figure 5 is a similar view of the rack shown in Figure 3.

Specifically describing the illustrated embodiment of the invention, the reference character A designates the bottom container or boiler which is adapted to receive water and may be filled through an opening 1. A plurality of steaming compartments B and C are arranged in superposed relation upon the boiler A.

Each steaming compartment comprises a tubular casing 2 adapted to fit at one end into the boiler A or into the opposite end of another steaming compartment, each casing having an annular exterior projection or bead 3 for supporting the respective casing on the next lower casing or boiler. Each casing also has at the end resting upon the next lower casing, an inturned and upwardly inclined flange 4 which is provided with a plurality of apertures 5. These flanges are adapted to removably receive and support racks or the like upon which the material or food or cooking pans therefor may be placed.

Where it is desired to cook the food or material in pans or other receptacles, any suitable pans may be utilized, for example the pans 6, 7, 8 and 9 shown in the compartment C; and with such pans, in accordance with the invention, I provide a rack D which is so constructed and arranged as to conduct water of condensation formed thereon and on the pans 6, 7, 8 and 9, to the flange 4 and through the apertures 5 of the respective casings back to the boiler A. This rack is preferably composed of a single sheet of metal which is concavo-convex in cross-section and formed with bead 10 at its periphery. The diameter of the bead is such as to accurately fit within the bead 11 on the inside of the flange 4 when the rack is placed on the flange with its convex side uppermost, whereby the rack is accurately centered in the casing 2 and held spaced from the aperture 5. For stably supporting the pans in a horizontal plane the rack may have stamped therefrom a plurality of radial upwardly projecting ribs 12 the tops of which are in substantially a common horizontal plane, with their inner ends merging together at the highest point 13 in the convex side of the rack. For preventing the pans 6, 7, 8 and 9 from contacting with the sides of the casing 2, certain of the ribs 12 may have upstanding protuberances 14 at their extremities for preventing lateral movement of the pans. With this construction, water of condensation which may form on the underside of the rack D will by virtue of the concavo-convex configuration of the rack flow by action of gravity to the flange 4. Similarly the water forming on the pans 6, 7, 8 and 9 will drop to the top of the rack D and flow by gravity to the flange 4. The water will then flow from the flange through the apertures 5 to the flange 4 of the next lower compartment. For obviating the possibility of the water not passing between the bead 10 of the rack and the flange 4 said bead may have a plurality of transverse indentations or depressions through which the water may flow from the inside of the bead to the apertures 5 in the flange 4.

Where it is desired to place the food or material to be steamed directly on the rack, for example meat to be roasted, the rack may have the construction shown in Figures 3 and 5 of the drawings. This rack comprises an annular frame of heavy wire 16 transversely of which are secured straight pieces 17 of similar wire which form in effect a grid, the diameter of the annular frame 16 is such as to accurately fit behind the bead 11 on the flange 4 so that the rack is centered in the corresponding casing 2. Preferably the frame 16 has portions thereof bent out of its plane as at 18 to form feet to hold the frame in spaced relation to the flange, and for the purpose of holding pans against lateral movement on the rack, when the pans or the like are used, the ends of certain of the straight wires 17 may be upturned as at 19 to perform the same function as do the protuberances 14 on the rack D.

The uppermost compartment is closed by a concavo-convex cover 20 to prevent escape of steam.

In use the boiler A and steaming compartments B, C are arranged in superposed relation as shown in Figure 1 of the drawings. Water having been placed in the boiler A is then boiled so that the steam thus generated passes upwardly through the apertures 5 of the flanges 4 into all of the steaming compartments. Any steam which may condense on the rack E will drop directly back into the boiler A or indirectly to the boiler by way of the flange 4 and apertures 5. Similarly steam condenseing on the rack D will pass through the apertures 5 of the compartment C by gravity to the flange 4 of the next lower compartment B and through the apertures 5 thereof into the boiler A. Water of condensation on the cover 20 will flow by gravity to the edges of the cover and drop onto the flange 4 of the uppermost compartment C and thence through the apertures 5 of the respective flanges 4 into the boiler. It will be observed that free flow of steam into all of the compartments is possible, and that the water of condensation is positively prevented from coming into contact with the food or material in any of the steaming compartments.

It is possible to use the apparatus for cold packing in which case the rack D would be entirely removed, the cans or the like to be cold-packed being placed upon the rack E.

It will be understood that the now preferred specific embodiment of my invention above described is primarily for illustrating the principles of the invention and that the details of construction of the cooking apparatus may be modified by those skilled in the art without departing from the spirit or scope of the invention.

Having thus described my invention, what I claim is:

1. A cooking apparatus comprising a boiler, a steaming compartment arranged in superposed relation thereon, and comprising a tubular casing having an inturned perforated annular flange, a rack for material to be steamed removably mounted on said flange and consisting of a plate concavo-convex in cross-section with its concave side at the bottom and having upstanding projections in a common horizontal plane on its convex side to support said material, and a cover for said compartment having its inner side concave.

2. A cooking apparatus comprising a boiler, a steaming compartment removably arranged in superposed relation thereon, and comprising a tubular casing having an inturned perforated annular flange at its lower edge, a rack for material to be steamed removably mounted on said flange, and a cover for said compartment having its inner side concave, whereby the steam from said boiler can freely pass upwardly from said boiler into said compartment and water of condensation can flow by gravity from said cover, the walls of said casing and said rack to said flange and through said perforations into said boiler.

HENRY BRUCKER.